United States Patent Office 3,767,628
Patented Oct. 23, 1973

3,767,628
AGE RESISTERS AND AGE RESISTANT
POLYMERIC COMPOSITIONS
Richard H. Kline, Cuyahoga Falls, Ohio, assignor to The
Goodyear Tire & Rubber Company, Akron, Ohio
No Drawing. Original application June 23, 1969, Ser. No.
835,741, now Patent No. 3,658,769. Divided and this
appplication Jan. 17, 1972, Ser. No. 218,467
Int. Cl. C08d 3/06; C08f 27/08; C08g 20/20
U.S. Cl. 260—78 UA                      15 Claims

ABSTRACT OF THE DISCLOSURE

Amide and imide age resisters such as N-(4-anilinophenyl) acrylamide, N-(4-anilinophenyl) maleamic acid and N-(4-anilinophenyl) maleimide, age resistant polymers having amide and imide age resisters physically combined therewith and age resistant polymeric compositions prepared by free radical polymerization techniques involving the use of said amides and imides as monomers.

This is a divisional application of copending application Ser. No. 835,741 filed June 23, 1969, now U.S. Pat. No. 3,658,769.

This invention relates to age resisters, age resistant polymeric compositions and processes for preparing said age resisters and age resistant compositions. More particularly the invention relates to polymeric compositions that possess a high degree of resistance to the deleterious effects of oxidative aging over a prolonged period of time even after said compositions have been subjected to solvents which would extract at least a portion of many conventional age resisters when used to stabilize polymeric compositions.

Essentially all types of rubber, both natural and synthetic, and particularly rubbers formed from dienes, are known to be susceptible to deterioration resulting from prolonged exposure to oxidative aging. A great deal of effort has been expended by those engaged in the field of polymer technology to develop various stabilizers that will effectively inhibit the adverse effects of aging of polymeric compositions. Unfortunately many of the commercially accepted stabilizers may be volatilized when the polymeric products are exposed to elevated temperatures over prolonged periods of time. Furthermore, they are rather quickly extracted from polymeric compositions by repeated washings with aqueous detergent solutions or organic solvents. These severe conditions are routinely encountered by garments containing rubber when they are subjected to frequent laundering or drycleaning.

It is therefore an object of this invention to provide age resisters and polymeric compositions that are resistant to oxidative aging. It is another object of this invention to provide processes for preparing age resisters and age resistant polymeric compositions and intermediate compounds suitable for preparing said compositions. A further object of this invention is to provide polymeric compositions that are highly resistant to oxidative aging at elevated temperatures even after repeated exposure to aqueous detergent solutions or drycleaning fluids. It is a still further object of this invention to provide polymers possessing antioxidants chemically bound thereto.

In accordance with the present invention age resistant polymeric compositions are prepared by polymerizing certain nitrogen containing compounds with one or more comonomers. The amine compounds which can be so used are selected from the group consisting of (A) amides having the following structural formula:

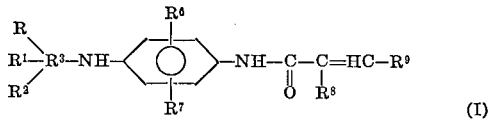

(I)

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are selected from the group consisting of hydrogen and alkyl radicals having from 1 to 4 carbon atoms, $R^8$ is selected from the group consisting of hydrogen, alkyl radicals having from 1 to 4 carbon atoms, aryl radicals having from 6 to 12 carbon atoms, aralkyl radicals having from 7 to 13 carbon atoms, cycloalkyl radicals having from 5 to 12 carbon atoms, carboxymethyl radical and carbalkoxymethyl radicals, and $R^9$ is selected from the group consisting of hydrogen, alkyl radicals having from 1 to 4 carbon atoms, aryl radicals having from 6 to 12 carbon atoms, cycloalkyl radicals having from 5 to 12 carbon atoms, carboxyl radical and carbalkoxy radicals and (B) imides selected from the group consisting of (1) compounds having the following structural formula:

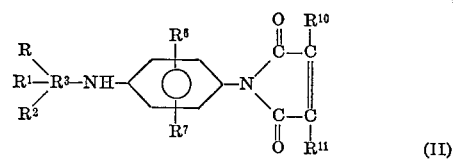

(II)

wherein R, $R^1$, $R^2$, $R^3$, $R^6$ and $R^7$ are as previously defined herein under Structural Formula I and wherein $R^{10}$ and $R^{11}$ are selected from the group consisting of hydrogen and alkyl radicals having from 1 to 4 carbon atoms and (2) compounds having the following structural formula:

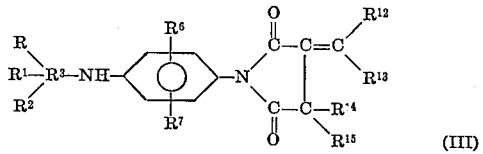

(III)

wherein R, $R^1$, $R^2$, $R^3$, $R^6$ and $R^7$ are as previously defined herein under Structural Formula I and wherein $R^{12}$, $R^{13}$, $R^{14}$ and $R^{15}$ are selected from the group consisting of hydrogen and alkyl radicals having from 1 to 4 carbon atoms.

Under Structural Formula I the carbalkoxymethyl radicals preferably have the following structural formula:

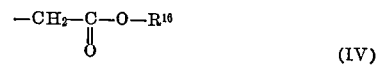

(IV)

whererin $R^{16}$ is an alkyl radical having from 1 to 4 carbon atoms. The carbalkoxy radicals preferably have the following structural formula:

whererin $R^{17}$ is an alkyl radical having from 1 to 4 carbon atoms.

In Structural Formulae I, II and III, $R^3$ preferably is a phenyl radical, although it may be any other aryl radical, such as a naphthyl radical. When $R^2$ is a radical having the structural formula

then $R^2$ is preferably in the para position. $R^6$ and $R^7$ are preferably selected from the group consisting of hydrogen and methyl. In Structural Formula I, preferably $R^8$ is selected from the group consisting of hydrogen and methyl. $R^{16}$ and $R^{17}$ in the preferred carbalkoxymethyl and carbalkoxy radicals respectively are preferably methyl or ethyl radicals.

Representative amides which can be used in the present invention are as follows.

N-(4-anilinophenyl) acrylamide
N-(4-anilinophenyl) methacrylamide
N-(4-anilinophenyl) cinnamamide
N-(4-anilinophenyl) crotonamide
N-[4-(4-methylanilino)phenyl] acrylamide
N-[4-(4-methylanilino)phenyl] methacrylamide
N-[4-(4-methoxyanilino)phenyl] acrylamide
N-[4-(4-methoxyanilino)phenyl] methacrylamide
N-[4-(4-ethoxyanilino)phenyl] acrylamide
N-[4-(4-ethoxyanilino)phenyl] methacrylamide
N-[4-(4-N,N-dimethylaminoanilino)phenyl] acrylamide
N-(4-anilinophenyl) maleamic acid
N-(4-anilinophenyl) itaconamic acid
N-[4-(4-methylanilino)phenyl] maleamic acid
N-(4-anilinophenyl) citraconamic acid Representative imides which can be used in the present invention are as follows.

N-(4-anilinophenyl) maleimide
N-(4-anilinophenyl) itaconimide
N-(4-anilinophenyl) citraconimide
N-[4-(4-methylanilino)phenyl] maleimide
N-[4-(4-methylanilino)phenyl] itaconimide
N-[4-(4-methoxyanilino)phenyl] maleimide
N-[4-(4-methoxyanilino)phenyl] itaconimide
N-[4-(4-ethoxyanilino)phenyl] maleimide
N-[4-(4-ethoxyanilino)phenyl] itaconimide
N-[4-(4-ethoxyanilino)phenyl] citraconimide
N-(4-anilinophenyl)phenyl maleimide
N-[4-(4-N,N-dimethylaminoanilino)phenyl] maleimide The method of preparing the amides and imides is not critical to the performance of these compounds in the practice of the present invention.

The amides can be prepared by reacting, normally in substantially equal molar amounts, an amine of the structure

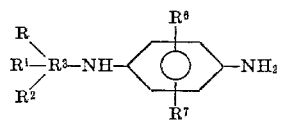

with an acid halide of the structure:

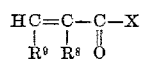

wherein R, $R^1$, $R^2$, $R^3$, $R^4$, $R^5$, $R^6$, $R^7$, $R^8$ and $R^9$ are as defined earlier herein and wherein X is selected from the group consisting of chloride and bromide radicals, in the presence of an acid absorbing agent which may be an inorganic salt, e.g. sodium carbonate, or an organic tertiary amine, e.g. triethylamine. The reaction is usually carried out by dropwise addition of a solution of the acid halide in an aprotic solvent to a solution of the amine which contains in solution or in suspension a compound capable of reacting with the hydrogen halide formed during the reaction. A slight excess of acid halide may be used. The reaction is usually exothermic so the temperature during reaction is held to a maximum of 50° C. by means of an ice water bath. The reaction mixture is stirred for an hour or more after the addition of acid halide has been completed. The product usually precipitates during the course of the reaction. It is then filtered off, dried, and purified as necessary.

The imides are prepared by reacting, normally in substantially equal molar amounts, an amine of the structure described above in the preparation of amides with a cyclic acid anhydride selected from the group consisting of compounds having the following structural formulae:

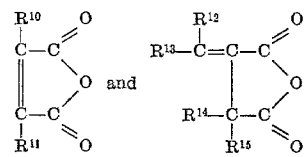

wherein $R^{10}$, $R^{11}$, $R^{12}$, $R^{13}$, $R^{14}$ and $R^{15}$ are as defined earlier herein, separating the amic acid which forms, and dehydrating this compound with a dehydrating agent such as acetic anhydride in a subsequent reaction. The first reaction is carried out by mixing a solution of the anhydride in an inert solvent with a solution of the amine, likewise in an inert solvent. The reaction can be carried out at room temperature. The reaction mixture is stirred for several minutes and the product which has precipitated is filtered off, washed with solvent, and dried. The second step is carried out by heating a mixture of the intermediate amic acid with sodium acetate and a large excess of acetic anhydride at 60 to 80° C. for a brief period of time and then pouring the reaction mixture into water. The product which precipitates is filtered off, dried, and purified if desired.

Examples of amines which can be used in preparing amides and imides are as follows.

4-aminodiphenylamine
4-amino-4'-methyl diphenylamine
4-amino-4'-methoxy diphenylamine
4-amino-4'-ethoxy diphenylamine
4-amino-4'-(N,N-dimethylamine) diphenylamine
4-amino-4'-isopropyl diphenylamine Examples of acid halides which can be used in preparing amides are as follows.

acryloyl chloride
   methacryloyl chloride
   crotonyl chloride
   cinnamoyl chloride
   acryloyl bromide Examples of cyclic acidic anhydrides which can be used in preparing imides are maleic anhydride, itaconic anhydride, and citraconic anhydride.

Examples of dehydrating agents which can be used in preparing imides are acetic anhydride and propionic anhydride.

The aforementioned amides and imides may be polymerized by well known free radical polymerization techniques with one or more comonomers that are known to polymerize in free radical initiated polymerization systems. The polymerizations may be carried out in emulsion, suspension, bulk or solution type systems. Some adjustments in the polymerization recipe and/or conditions may be necessary to obtain a satisfactory rate of polymer formation, depending on the amount of monomeric age resister included and the other monomers involved. These adjustments, where necessary, are to counteract the inhibitory effect of the monomeric age resister and to insure its solubility in the system. Solvents may also be required to obtain adequate solubility of the monomers with each other as well as to solubilize other ingredients where required. Some solvents, such as methyl ethyl ketone or isopropyl alcohol, can be used to advantage with an emulsion polymerization system.

Examples of free radical initiators that are useful in the practice of this invention are those known as "Redox" initiators, such as appropriate combinations of chelated iron salts, sodium formaldehyde sulfoxylate and organic hydroperoxides such as cumene and paramenthane hydroperoxides. Other initiators such as azoisobutyronitrile, benzoyl peroxide, hydrogen peroxide and potassium persulfate may also be used, depending on the particular polymerization system.

Examples of comonomers that are useful in the practice of this invention are conjugated diene monomers, such as butadiene-1,3; 2 - chlorobutadiene-1,3; isoprene; piperylene; and hexadienes and vinyl monomers such as styrene, α-methylstyrene, divinyl benzene, vinyl chloride, vinyl acetate, vinylidene chloride, methylmethacrylate, ethylacrylate, vinylpyridine, acrylonitrile, methacrylonitrile, methacrylic acid and acrylic acid. Mixtures of the monomeric age resisters and mixtures of the comonomers may be used. The monomer charge ratio is normally from about 0.10/99.9 to about 10/90 or even 20/80 monomeric age resister/comonomer. A charge ratio of about 0.5/99.5 to about 5.0/95 is preferred. Ratios will vary depending on the amount of age resister desired to be bound and on the reactivity ratios of the monomers in the particular polymerization system used. However, the ratio may be even higher and even constitute all of the monomer charged, i.e., the ratio can be 100/0. The polymers resulting from the free radical polymerizations of monomeric systems containing the monomeric age resisters of the present invention contain segmeric units having the following structures. Where the monomeric age resister has a structural formula according to (I) the segmeric unit has the following structural formula:

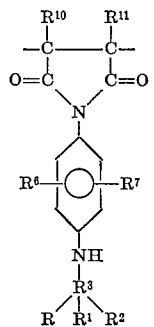

(VI)

wherein R, $R^1$, $R^2$, $R^3$, $R^6$, $R^7$, $R^8$ and $R^9$ are as defined in Structural Formula (I).

Where the monomeric age resister has a structural formula according to (II), the segmeric unit has the following structural formula:

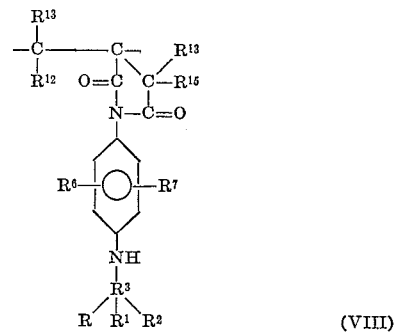

(VII)

wherein R, $R^1$, $R^2$, $R^3$, $R^6$, $R^7$, $R^{10}$ and $R^{11}$ are as defined earlier herein Structural Formulae I and II.

Where the monomeric age resister has a structural formula according to (II), the segmeric unit has the following structural formula:

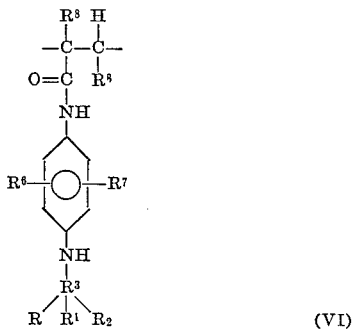

(VIII)

wherein R, $R^1$, $R^2$, $R^3$, $R^6$, $R^7$, $R^{12}$, $R^{13}$, $R^{14}$, and $R^{15}$ are as defined in Structural Formulae I and III. Preferably the comonomers are selected to produce an elastomeric copolymer.

These polymers, whether liquid or solid, have a special advantage in that the age resistant portion is not extractable, and therefore the polymeric compositions are highly resistant to oxidative aging even after repeated exposure to aqueous detergent solutions or drycleaning fluids. This feature is especially significant where polymers are used in foam backings for rugs and where polymers are used in solution or latex form to treat fabrics, since such products are often exposed to aqueous detergent solutions or drycleaning fluids.

To afford adequate protection against degradation the polymers should contain from about 0.10 part to about 10.0 parts by weight of the segmeric form of the amide or imide per 100 parts by weight of the polymer, although from about 0.50 part to about 5.0 parts is normally satisfactory, from about 0.50 part to about 3.0 parts being preferred. As much as 50 parts and more of the polymer may consist of the amide or imide segmeric unit. In fact, polymers containing 100 percent amide and/or imide segmeric units may be produced, if desired. However, as the amount of bound age resister increases the physical characteristics of the polymer are altered accordingly. Where it is desired to produce a polymer which is self stabilizing and which substantially retains the physical properties of the comonomer or comonomers, normally the polymer should contain no more than about 10.0 parts by weight of the amide and/or imide segmeric unit. Such polymers preferably are solid, although they may be liquid. Where it is desired that the polymer act as a polymeric age resister which may be blended with unstabilized polymers the polymer should normally contain greater amounts of the monomeric age resister, e.g., from about 10 up to 100 parts. The remainder of the polymer is comprised preferably of the segmeric form of at least one conjugated diene monomer and/or the segmeric form of at least one vinyl monomer. Preferably the polymers contain at least 50 percent by weight of the segmeric form of a conjugated diene such as butadiene-1,3 or isoprene.

All of the amine compounds described herein many of which are novel compounds, are capable of stabilizing polymers by simple incorporation into the polymers by conventional techniques such as by addition to polymer latices or by addition to the solid polymer on a mill or in a Banbury.

The polymers that may be conveniently protected by the amides and imides described herein are vulcanized and unvulcanized polymers susceptible to oxygen degradation, such as natural rubber, balata, gutta percha and rubbery synthetic polymers containing carbon to carbon double bonds. Representative examples of the synthetic polymers used in the practice of this invention are polychloroprene; homopolymers of a conjugated 1,3-diene such as isoprene and butadiene with up to 50 percent by weight of at least one copolymerizable monomer such as styrene and acrylonitrile; butyl rubber, which is a polymerization product of a major proportion of a monoolefin and a minor proportion of a multiolefin such as butadiene or isoprene; polyurethanes containing carbon to carbon double bonds; and polymers and copolymers of monoolefins containing little or no unsaturation, such as polyethylene, polypropylene, ethylene propylene copolymers and terpolymers of ethylene, propylene and a nonconjugated diene. When added in free form normally 0.001 to 10.0 percent of the age resister by weight based on the weight of the polymer can be used, although the precise amount of the age resisters which is to be employed will depend somewhat on the nature of the polymer and the severity of the deteriorating conditions to which the polymer is to be exposed. In unsaturated polymers such as those made from conjugated dienes, the amount of age resister necessary is greater than that required by a saturated polymer such as polyethylene. It has been found that an effective antioxidant amount of the disclosed stabilizers in rubbery unsaturated polymers will generally range from 0.05 to 5.0 percent by weight based on the weight of the polymer although it is commonly preferred to use from 0.5 to 3.0 percent by weight based on the weight of the polymer. Mixtures of the age resisters may be used.

The following examples illustrate the practice of the present invention. Unless otherwise indicated, all parts are parts by weight.

Examples 1 to 6 illustrate the preparation of age resisters which can be used to stabilize polymers by physically combining the polymers therewith or which can be used in free radical polymerization systems as monomers to produce self-stabilizing polymers.

EXAMPLE 1

N-(4-anilinophenyl) acrylamide was prepared by adding a solution of 10 grams of acryloyl chloride in 50 milliliters of benzene to a flask containing 18.4 grams of p-aminodiphenylamine, 6 grams of sodium carbonate and 100 milliliters of benzene. The addition was accomplished in 50 minutes at 30 to 40° C. The mixture was stirred two hours longer and the precipitate which was formed was filtered off, washed thoroughly with water, and dried. The yield was 15.5 grams (65%) while the melting point of the product was 148 to 150° C.

EXAMPLE 2

N-(4-anilinophenyl) maleamic acid was prepared by adding 19.6 grams of maleic anhydride to a solution of 38.8 grams of p-aminodiphenylamine in 100 milliliters of dioxane at room temperature. The precipitate which was formed was filtered off and dried. The yield was 56 grams (99%), while the melting point of the product was 186 to 187° C.

EXAMPLE 3

N-(4-anilinophenyl) maleimide was prepared by heating a mixture of 25 grams of N-(4-anilinophenyl) maleamic acid, 5.4 grams of sodium acetate and 90 grams of acetic anhydride for 10 minutes at 70° C. The mixture was then poured into water and the precipitate which formed was filtered off, washed with water, and dried. The yield was 22 grams (94%), while the melting point of the product was 145 to 148° C.

EXAMPLE 4

N-(4-anilinophenyl) cinnamamide was prepared by adding dropwise a solution of 16.6 grams of cinnamoyl chloride in 50 milliliters of benzene to a mixture of 18.4 grams of p-aminodiphenylamine, 6 grams of sodium carbonate, and 200 milliliters of benzene. The addition was completed in one hour at 22 to 31° C., and the reaction mixture was stirred two hours longer. The solid which precipitated during the reaction was filtered off, washed thoroughly with water, refiltered and dried.

The yield was 30 grams (95%), while the melting point of the product was 165 to 170° C.

EXAMPLE 5

N-(4-anilinophenyl) crotonamide was prepared by adding dropwise a solution of 10.5 grams of crotonyl chloride in 150 milliliters of benzene to a mixture of 18.4 grams of p-aminodiphenylamine, 6 grams of sodium carbonate, and 100 milliliters of benzene. The addition was completed in 45 minutes at 22 to 40° C. The solid which precipitated during the reaction was filtered off, washed thoroughly with water, refiltered and dried. The product was then slurried with benzene, filtered and dried.

The yield was 10.5 grams (42%), while the melting point of the product was 125 to 127° C.

EXAMPLE 6

N-(4-anilinophenyl) itaconamic acid was prepared by pouring a solution of 22.4 grams of itaconic anhydride in 100 milliliters of benzene into a solution of 36.8 grams of p-aminodiphenylamine in 100 milliliters of dioxane. The mixture was stirred for 30 minutes, and the precipitate which had formed was filtered off, washed with benzene, and dried.

The yield was 35.5 grams (60%), while the melting point of the product was 164 to 167° C.

The following Examples 7 to 12 illustrate the preparation of polymers containing amide or imide age resisters as part of the polymeric chain.

EXAMPLE 7

The following polymerization was carried out in a four ounce bottle equipped with a screw cap containing a Teflon liner. To a solution of 0.8 gram of sodium dodecyl benzene sulfonate, 0.026 gram of the sodium salt of condensed naphthalene sulfonic acid, 0.08 gram of tripotassium phosphate and 38 milliliters of water was added one gram of N-(4-anilinophenyl) maleimide. To this mixture was added 6 drops of tertiary dodecyl mercaptan, 5 grams of acrylonitrile and 15 grams of butadiene. Three and one-half milliliters of a solution containing 0.008 gram of a 34 percent aqueous solution of a 90/10 mixture of tetrasodium salt of ethylene diamino tetracetic acid and monosodium salt of N,N-di($\alpha$-hydroxyethyl) glycine, hereinafter referred to as chelating agent, 0.008 gram of $$FeSO_4 \cdot 7H_2O$$

and 0.006 gram of sodium formaldehyde sulfoxylate dissolved in water was then added, followed by the addition of 0.24 milliliter of a solution containing 0.012 gram of p-menthane hydroperoxide dissolved in benzene. The bottle was then tumbled in a polymerization bath at 25° C. for 18 hours. The conversion was 20 percent. The polymer was coagulated by adding the latex to 250 milliliters of isopropyl alcohol. It was then washed thoroughly with water and allowed to dry.

EXAMPLE 8

The same procedure as described in Example 7 was followed, with the exception that one gram of N-(4-anilinophenyl) acrylamide was substituted for the N-(4-anilinophenyl) maleimide. The conversion was 84.5 percent.

The dry polymers from Examples 7 and 8 were extracted for 48 hours with methanol in a Soxhlet type apparatus to remove any of the free monomeric age resister, dried again, and then dissolved in benzene. The benzene solutions were poured into aluminum trays and the solvent was allowed to evaporate. The resulting films were placed in an oxygen absorption apparatus. The amount of oxygen absorbed in a particular interval of time was determined and is listed in the following Table I. The testing procedure is described in further detail in Industrial and Engineering Chemistry, vol. 43, page 456 (1951) and Industrial and Engineering Chemistry, vol. 45, page 392 (1953).

A polymer was also prepared and processed as described in Examples 7 and 8 with the exception that no amide or imide was used in the polymerization recipe. Oxygen absorption data was also gathered for this polymer and is listed in Table I.

In addition, both the N-(4-anilinophenyl) acrylamide and N-(4-anilinophenyl) maleimide were tested as conventional antioxidants in SBR 1006. The SBR polymer (1006) was dissolved in benzene and benzene solutions of the above age resisters were added to portions of the SBR solutions to provide 1.00 part of the age resisters per 100 parts of rubbery polymer. The benzene solutions were used to form films and tested in oxygen absorption apparatus as described above.

TABLE I

| Antioxidant | Hours to 1 percent oxygen absorbed | |
|---|---|---|
| | Built in at 90° C. | SRB-1006 at 100° C. |
| None [1] | 1 | |
| N-(4-anilinophenyl) acrylamide [2] | 520 | 500 |
| N-(4-anilinophenyl) maleimide [3] | 440 | [4] 500 |

[1] (75/25) butadiene/acrylonitrile.
[2] (75/25/5) butadiene/acrylonitrile/acrylamide.
[3] (75/25/5) butadiene/acrylonitrile/maleimide.
[4] To 0.9% $O_2$.

EXAMPLES 9 AND 10

The copolymerizations of Examples 9 and 10 were carried out as follows.

The quantities of ingredients listed below were charged into four ounce, screw capped bottles, as in Example 7.

| | Example 9 (parts) | Example 10 (parts) |
|---|---|---|
| Isoprene | 20 | 19 |
| Acrylonitrile | | 1 |
| Methyl ethyl ketone | 3 | |
| Methanol | 3 | 6 |
| Ammonium chloride | 0.002 | |
| N-(4-anilinophenyl) maleimide | 0.2 | |
| N-(4-anilinophenyl) acrylamide | | 0.2 |
| HCl | | [4] |
| 70% $H_2O_2$ | 0.08 | 0.08 |

[4] 0.1 mol equivalent of HCl added per mol of N-(4-anilinophenyl) acrylamide.

The bottles were sealed and tumbled in a water bath at 80° C. for 17 hours, at which time they were removed from the bath and cooled in a refrigerator. An additional 0.08 part of 70% $H_2O_2$ was placed in each bottle. After being tumbled for an additional 17 hours in the water bath at 80° C. the bottles were again cooled in a refrigerator. A small aliquot of each was evaporated to dryness to determine conversion. The conversion for Example 9 was 30 percent and the conversion for Example 10 was 38.3 percent.

The liquid polymer from each polymerization was isolated and purified by the following process. The contents of each of the polymerization bottles were poured into separate beakers containing 200 milliliters of methanol. The mixtures were thoroughly stirred and the liquid polymers allowed to settle. The supernatant serum was decanted from each and the polymer dissolved in 50 milliliters of benzene. Each liquid polymer was precipitated again by adding 200 milliliters of methanol and the supernatant liquid decanted. Each polymer was redissolved and reprecipitated with methanol a total of three times. The milky, viscous, liquid polymers were dried in a vacuum oven at 50° C. Three grams of each of the liquid polymers were dissolved in 25 milliliters of benzene and 0.2 gram of toluene diisocyanate was added. Half of the solution was then poured into each of the two weighed aluminum trays. The trays were allowed to stand in a hood at room temperature until the benzene had evaporated and were then placed in an oven at 55° C. for 72 hours. The cured films were then placed into the oxygen absorption apparatus and tested in the same fashion as the polymers of Examples 7 and 8. The test results are listed in Table II.

TABLE II

| Example | Antioxidant | Hours to 1 percent oxygen absorbed at 90° C. |
|---|---|---|
| 9 | N-(4-anilinophenyl) maleimide [5] | 107 |
| 10 | N-(4-anilinophenyl) acrylamide [6] | 103 |

[5] (100/1) isoprene/maleimide.
[6] (95/5/1) isoprene/acrylonitrile/acrylamide.

EXAMPLE 11

The following recipe was used in preparing a butadiene/styrene/acrylamide terpolymer.

| | Parts |
|---|---|
| Butadiene | 75 |
| Styrene | 25 |
| N-(4-anilinophenyl) acrylamide | 2.5 |
| Tertiary dodecyl mercaptan | 0.24 |
| 50/50 mixture of a potassium soap of a disproportionated rosin acid and a sodium soap of a fatty acid | 4.5 |
| Tripotassium phosphate | 0.25 |
| Sodium salt of condensed naphthalene sulfonic acid | 0.08 |
| Water | 200 |
| $Na_2S_2O_4$ | 0.056 |
| $FeSO_4 \cdot 7H_2O$ | 0.015 |
| Chelating agent | 0.070 |
| Sodium formaldehyde sulfoxylate | 0.050 |
| Para-menthane hydroperoxide | 0.12 |

The ingredients were changed to a four ounce bottle, equipped with a screw cap and a self sealing gasket so aliquots could be removed by hypodermic needle, in an amount equal to one-fifth of the recipe weight, in grams. The following procedure was used. The N-(4-anilinophenyl) acrylamide was dissolved in methyl ethyl ketone to produce a 4 percent solution. The soap, $K_3PO_4$ and sodium salt of condensed naphthalene sulfonic acid were dissolved in 75 percent of the water and placed in the bottle. One-half of the styrene containing the t-dodecyl mercaptan and the solution of the acrylamide was added. The butadiene was added in a slight excess and the excess allowed to vent off to flush air out of the bottle before sealing. The chelating agent, $FeSO_4 \cdot 7H_2O$, $Na_2S_2O_4$ and sodium formaldehyde sulfoxylate were dissolved in the remainder of the water and added to the bottle by means of a hypodermic syringe. The bottle was then placed in a water bath at 5° C. and tumbled about one-half hour. The remainder of the styrene containing the paramenthane hydroperoxide was then added by hypodermic syringe and the bottles tumbled at 5° C. for 65 hours. The final conversion was found to be 65 percent.

The polymer in the form of small particle size crumb was obtained by pouring the contents of the bottle, slowly, into 600 milliliters of methanol. Since the supernatent liquid turbid, 10 milliliters of 1.0 N $H_2SO_4$ was added to make it acid. This yielded a light blue colored crumb in a clear supernatent liquid. The liquid was decanted and replaced with 800 milliliters of acidified isopropyl alcohol to remove unpolymerized monomers and other nonrubber ingredients. The crumb was washed once more with methanol and dried in a vacuum oven.

EXAMPLE 12

A butadiene/acrylonitrile (67/33) copolymer containing N-(4-anilinophenyl) acrylamide was prepared in the same manner as the polymer of Example 11 except that the t-dodecyl mercaptan and para-menthane hydroperoxide were dissolved in portion of acrylonitrile and the amount of para-methane hydroperoxide was increased to 0.6 part per hundred of the butadiene/acrylonitrile mixture. Enough of the 4 percent methyl ethyl ketone solution of the acrylamide was charged to supply 1.88 parts of the acrylamide per 100 parts of the butadiene/acrylonitrile mixture. This polymerization was run at 20° C. for 4.5 hours, at which time a conversion of 70 percent was reached. The polymer was recovered in the manner described in Example 11.

The products of both Examples 11 and 12 were extracted in the same fashion as the polymers of Examples 7 and 8. The purified polymers of Examples 11 and 12 were then tested in oxygen absorption equipment in the same manner as the polymers of Examples 7, 8, 9 and 10. The results are listed in Table III.

TABLE III

| Example | Antioxidant | Percent oxygen absorbed at 100° C. | Hours |
|---|---|---|---|
| 11 | N-(anilinophenyl) acrylamide [7] | 0.6 | 330 |
| 12 | N-(anilinophenyl) acrylamide [8] | 0.78 | 358 |

[7] (75/25/2.5) butadiene/styrene/acrylamide.
[8] (67/33/1.88) butadiene/acrylonitrile/acrylamide.

If the polymerizations of Examples 11 and 12 were run in the absence of the above acrylamide it would be expected that the polymers would absorb one percent oxygen in less than 5 hours at 100° C.

A polymerization was run similar to that of Example 11 except that only 1.25 parts of 4-(anilinophenyl) acrylamide was charged. The extracted polymer absorbed one percent oxygen at 100° C. in 323 hours.

N-(4 - anilinophenyl) cinnamamide, N - (4 - anilinophenyl) crotonamide, N-(4 - anilinophenyl) itaconamic acid and N - (4 - anilinophenyl) maleamic acid were also tested as conventional antioxidants in SBR 1006 at the 1.0 part level in the same fashion as were the N-(4-anilinophenyl) acrylamide and N-(4-anilinophenyl) maleimide as earlier described herein. The results are listed in Table IV.

TABLE IV

| Antioxidant: | Hours to 1/ oxygen absorbed at 100° C. |
|---|---|
| N-(4-anilinophenyl) cinnamamide | 560 |
| N-(4-anilinophenyl) crotonamide | 640 |
| N-(4-anilinophenyl) itaconamic acid | 532 |
| N-(4-anilinophenyl) maleamic acid | 644 |

The above data demonstrate that the amides and imides described herein are capable of providing age resistant polymeric compositions by either polymerizing the amide and/or imide in a free radical polymerization system along with comonomers or by incorporating the amides and/or imides by conventional techniques into the polymers. That is, the age resisters provide protection whether in a free or bound condition. Any of the monomeric age resisters, comonomers or polymers described earlier herein can be substituted for their counterparts in the above working examples to provide age resistant polymeric compositions. Also, free radical polymerization systems other than emulsion and solution systems, for example, free radical suspension systems, may also be used. If desired, the monomer system can consist entirely of the age resistant monomers or monomers. Naturally polymerization rates and amounts of bound monomer will vary, depending upon the monomers used. Also, reactor size and degree of agitation can affect polymerization rates. However, optimum conditions can be determined based upon the above revelations by routine experimentation by one possessing ordinary skill in the art.

The age resistant polymeric compositions prepared by chemically binding the age resisters or by physically incorporating them into polymers, are age resistant, whether in vulcanized or unvulcanized form. The may be used, depending on the particular polymer involved, in products such as tires, industrial rubber products, such as transmission belts and hose, and molded goods. Where the polymeric composition contains the age resister as an integral part of the polymer chain it is especially useful in applications where a product is frequently exposed to aqueous detergent solutions or drycleaning fluids, for example, in foam backings for rugs and in polymer treated fabrics.

While certain representative embodiments and details have been shown for the purpose of illustrating the invention it will be apparent to those skilled in this art that various changes and modifications may be made therein without departing from the spirit or scope of the invention.

What is claimed is:

1. A polymer at least a portion of its segmeric units being comprised of at least one of the age resistant segmeric units selected from the group consisting of (A) segmeric units having the following structural formula:

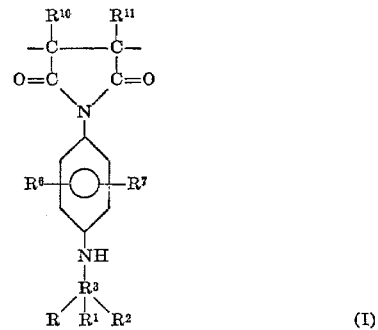
(I)

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are selected from the group consisting of hydrogen and alkyl radicals having from 1 to 4 carbon atoms and wherein $R^{10}$ and $R^{11}$ are selected from the group consisting of hydrogen and alkyl radicals having from 1 to 4 carbon atoms, and (B) segmeric units having the following structural formula:

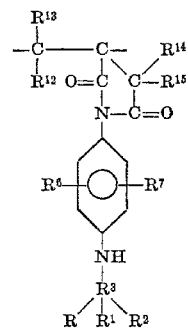
(II)

wherein R, $R^1$, $R^2$, $R^3$, $R^6$ and $R^7$ are as defined in Structural Formula I and wherein $R^{12}$, $R^{13}$, $R^{14}$ and $R^{15}$ are selected from the group consisting of hydrogen and alkyl radicals having from 1 to 4 carbon atoms wherein the polymer contains 0.10 part to 10.0 parts by weight of the age resistant segmeric unit per 100 parts by weight of polymer and wherein the polymer contains at least 50 parts by weight of the segmeric form of conjugated diene monomer per 100 parts by weight of polymer.

2. The polymer of claim 1 wherein $R^2$ is a radical having the following structural formula:

wherein $R^4$ and $R^5$ are as defined in claim 1 and wherein $R^2$ is in the para position.

3. The polymer of claim 1, wherein the polymer contains from 0.10 part to 10.0 parts by weight per 100 parts by weight of polymer of the age resistant segmeric unit and correspondingly 90 parts to 99.9 parts by weight of at least one segmeric form of at least one comonomer selected from the group consisting of conjugated 1,3-diene monomers and vinyl monomers.

4. The polymer of claim 3 wherein the polymer contains at least 50 parts by weight of at least one segmeric form of 1,3-butadiene.

5. The polymer according to claim 3 wherein R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms and alkoxy radicals having from 1 to 4 carbon atoms, $R^3$ is selected from the group consisting of phenyl and naphthyl, $R^6$ and $R^7$ are selected from the group consisting of hydrogen and methyl and wherein $R^{10}$ and $R^{11}$ are selected from the group consisting of hydrogen and alkyl radicals having from 1 to 4 carbon atoms.

6. The polymer according to claim 3 wherein the age resistant segmeric unit is the segmeric form of N-(4-anilinophenyl) maleimide.

7. A process of preparing an age resistant polymeric composition comprising polymerizing in a free radical polymerization system a monomer system comprising 0.10 to 10 parts by weight per 100 parts by weight of monomer of at least one monomer selected from the group consisting of (A) imide compounds having the following structural formula:

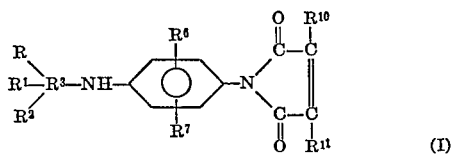

wherein $R^3$ is an aryl radical, R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms, alkoxy radicals having from 1 to 4 carbon atoms and a radical having the following structural formula:

wherein $R^4$ is selected from the group consisting of alkyl radicals having from 1 to 12 carbon atoms, cycloalkyl radicals having from 5 to 12 carbon atoms, aryl radicals having from 6 to 12 carbon atoms and aralkyl radicals having from 7 to 13 carbon atoms and $R^5$ is selected from the group consisting of hydrogen and alkyl radicals having from 1 to 12 carbon atoms and wherein $R^6$ and $R^7$ are selected from the group consisting of hydrogen and alkyl radicals having from 1 to 4 carbon atoms and wherein $R^{10}$ and $R^{11}$ are selected from the group consisting of hydrogen and alkyl radicals having from 1 to 4 carbon atoms and (B) imide compounds having the following structural formula:

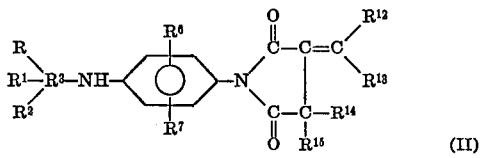

wherein R, $R^1$, $R^2$, $R^3$, $R^6$ and $R^7$ are as defined in Structural Formula I and wherein $R^{12}$, $R^{13}$, $R^{14}$ and $R^{15}$ are selected from the group consisting of hydrogen and alkyl radicals having from 1 to 4 carbon atoms and where the monomer system contains at least 50 parts by weight of conjugated diene monomer per 100 parts by weight of monomer.

8. The process of claim 7 wherein the monomer system contains from 0.10 part to 10.0 parts by weight per 100 parts per weight of total monomer of at least one imide compound according to claim 5 and correspondingly 90 parts to 99.9 parts by weight of at least one comonomer selected from the group consisting of conjugated 1,3-diene monomers and vinyl monomers.

9. The process of claim 8 wherein the monomer system contains at least 50 parts by weight of 1,3-butadiene per 100 parts by weight of total monomer.

10. The process according to claim 8 wherein R and $R^1$ are selected from the group consisting of hydrogen, alkyl radicals having from 1 to 4 carbon atoms and alkoxy radicals having from 1 to 4 carbon atoms, $R^2$ is selected from the group consisting of hydrogen, alkyl radicals having from 1 to 4 carbon atoms and alkoxy radicals having from 1 to 4 carbon atoms, $R^3$ is selected from the group consisting of phenyl and naphthyl, $R^6$ and $R^7$ are selected from the group consisting of hydrogen and methyl and wherein $R^{10}$ and $R^{11}$ are selected from the group consisting of hydrogen and alkyl radicals having from 1 to 4 carbon atoms.

11. The process according to claim 8 wherein the imide compound is N-(4-anilinophenyl) maleimide.

12. A solid copolymer of butadiene and acrylonitrile containing at least 50 parts by weight of the segmeric form of butadiene per 100 parts by weight of polymer and containing 0.10 part to 10.0 parts by weight of the segmeric form of N-(4-anilinophenyl)maleimide.

13. A process of preparing a solid age resistant polymeric composition comprising polymerizing in a free radical polymerization system a monomer comprised of butadiene, acrylonitrile, and N-(4-anilinophenyl)maleimide wherein the monomer system contains at least 50 parts by weight of butadiene and 0.10 part to 10.0 parts by weight of the N-(4-anilinophenyl)maleimide per 100 parts by weight of the total monomer.

14. The polymer according to claim 1 wherein the conjugated diene monomer is conjugated 1,3-diene monomer.

15. The process according to claim 7 wherein the conjugated diene monomer is conjugated 1,3-diene monomer.

References Cited
UNITED STATES PATENTS

| | | | |
|---|---|---|---|
| 3,148,196 | 9/1964 | Ladd | 260—800 |
| 3,352,832 | 11/1967 | Barr et al. | 260—78 |
| 3,441,545 | 4/1969 | Blatz et al. | 260—78.5 R |
| 3,676,404 | 7/1972 | Nield | 260—78.5 R |

JOSEPH L. SCHOFER, Primary Examiner

J. KIGHT, Assistant Examiner

U.S. Cl. X.R.

117—161 UN; 260—45.8 N, 45.9, 47 UA, 78.4 D, 78.5 BB, 80.7, 80.73, 82.1, 82.3, 85.3, 88.25, 89.7 R, 814

PO-1050
(5/69)

UNITED STATES PATENT OFFICE
CERTIFICATE OF CORRECTION

Patent No. 3,767,628           Dated  October 23, 1973

Inventor(s) Richard H. Kline

It is certified that error appears in the above-identified patent
and that said Letters Patent are hereby corrected as shown below:

Col. 3, line 1, "whererin" should read -- wherein --.
Col. 5, line 45, " $R^8$ " should read -- $R^9$ --.
Col. 6, line 4, "(II)" should read -- $(III)_4$ --;
       line 8, " $R^{13}$ " should read -- $R^{14}$ --.
Col. 9, Table I, "SRB-1006" should read -- SBR-1006 --.
Col. 10, after Table II, the following two sentences were
         omitted.

-- A polyisoprene polymer was prepared in essentially
   the same manner as the polymer of Example 9. The
   polymer absorbed one percent oxygen in 1.75 hours at
   90° C. --

Col. 10, line 32, "changed" should read -- charged --;
         line 57, after "liquid" insert -- was --;
                  "N" should read -- $\underline{N}$ --;
         line 71, "para-methane" should read -- para-menthane--.
Col. 11, line 37, " 1/ " should read -- 1% --;
         line 59, "monomers" first occurrence, should read
                  -- monomer --;
         line 69, "The" should read -- They --.

Signed and sealed this 2nd day of July 1974.

(SEAL)
Attest

EDWARD M. FLETCHER, JR.                C. MARSHALL DANN
Attesting Officer                      Commissioner of Patents